MULTI-FREQUENCY RELAXATION OSCILLATOR AND TIMING CIRCUIT

Filed Nov. 6, 1964

*INVENTORS*
LESTER ALVIN HELGESON
FRANCIS EDWARD MUELLER
BY
Carl W. Laumann Jr.
ATTORNEY United States Patent Office 3,329,907
Patented July 4, 1967

3,329,907

MULTI-FREQUENCY RELAXATION OSCILLATOR AND TIMING CIRCUIT

Lester Alvin Helgeson and Francis Edward Mueller, San Jose, Calif., assignors to International Business Machines Corporation, New York, N.Y., a corporation of New York

Filed Nov. 6, 1964, Ser. No. 409,515
9 Claims. (Cl. 331—111)

This invention relates generally to oscillators, and particularly to variable frequency relaxation oscillators.

Relaxation oscillators offer a convenient means for obtaining stable low frequency pulses. In certain cases it is desirable that the frequency be varied in a predetermined manner. One example of this requirement is the drive circuit used for synchronous stepping motors. Due to the mechanical inertia problem, a pulse driven stepping motor must be started with a low frequency pulse source and gradually accelerated to the highest speed. If a fixed frequency pulse source is used, it must operate no higher than the frequency which the motor can follow from a dead stop, resulting in a substantial reduction in the maximum speed from that attainable with the variable frequency pulse source.

Another example of a variable frequency pulse requirement is the conversion of data from analog time duration to digital pulse output. Certain process control requirements require the manipulation of a synchronous motor in discrete steps related to the time interval derived from a computer signal. The relationship of the time interval to the number of pulses is usually not linear. For example, a half-second analog time signal may produce one pulse to a synchronous stepping motor, while a two and one-half second signal produces twenty pulses. The first pulse rate is two pulses per second, and the second pulse rate is nine and one-half pulses per second.

Our invention uses a relaxation oscillator having a voltage sensing and discharge circuit connected to an RC timing circuit. The resistance end of the timing circuit is connected to a source of voltage allowing the capacitor to accumulate a charge by current flow through the resistor. When the voltage across the capacitor reaches a predetermined point, as determined by the voltage sensing circuit, the discharge of the capacitor through the voltage sensing circuit occurs, thereby terminating one cycle of operation. As is the case with all similar relaxation oscillators, the oscillation frequency is determined by the time required for the current passing through the resistor to charge the capacitor to the predetermined voltage. In the oscillator of our invention the frequency of oscillation is determined by a plurality of capacitors, one of which is connected directly to the voltage sensing and discharge circuit, and the others of which are connected by means of diodes, and in certain cases additional current limiting means. The diodes are forward biased during the charging period of the capacitor and become back biased when the circuit is discharged by the discharge circuit. This allows the other capacitors to be automatically switched out of the circuit at the end of their charging cycles. The charging cycle for each may be modified by the introduction of a current limiting resistance in series with the diode and capacitor.

The result is an oscillator having a low frequency at the outset which is increased when the additional capacitors become fully charged and switched out of the timing circuit by the blocking action of the reverse biased diode.

It is, therefore, an object of the present invention to provide an improved relaxation oscillator having a variable frequency output.

It is another object of the invention to provide a relaxation oscillator having an initial low frequency of oscillation and a later high frequency of oscillation.

Still another object of the invention is to provide an improved RC timing circuit for a relaxation oscillator.

The foregoing and other objects, features and advantages of the invention will be apparent from the following more particular description of preferred embodiments of the invention as illustrated in the accompanying drawings.

Figure 1:
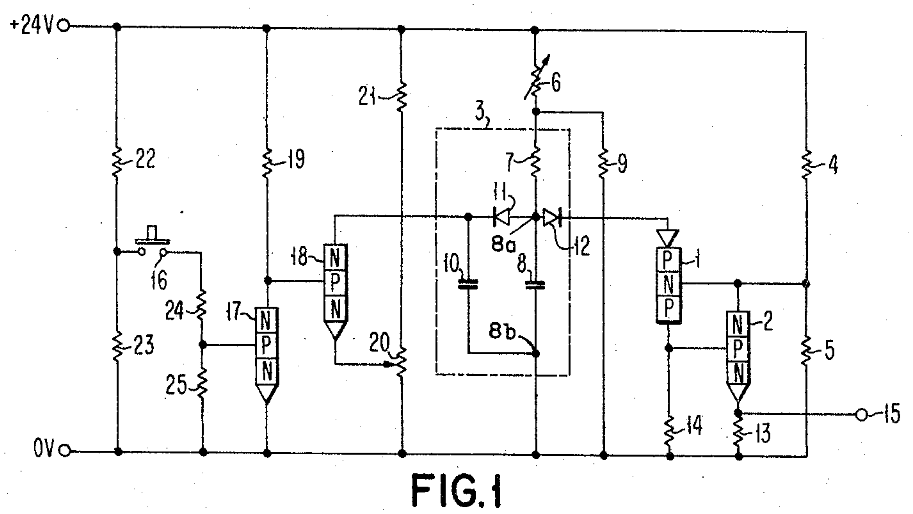
FIGURE 1 is a schematic drawing of an RC oscillator which produces pulses at two different frequencies in sequence.

Transistors 1 and 2, operating as a voltage sensing and discharge circuit, together with the timing circuit 3, make up a relaxation oscillator. Resistors 4 and 5 establish a voltage level at the interconnected base of transistor 1 and collector of transistor 2. When the circuit is oscillating, the current flowing through current limiting resistors 6 and 7 operates to charge timing capacitor 8, having a first terminal **8*a* and a second terminal 8*b*, at a rate determined by the magnitude of resistor 7, together with the voltage presented to this resistor by the divider network of resistors 6 and 9. The relatively high impedance of resistor 7 operates as a current source to the capacitors 8 and 10. Delay capacitor 10 is charged by the current flow through forward biased diode 11. Thus, the voltage presented to the emitter of transistor 1 through diode 12 is gradually increased as the current flowing through resistor 7** charges these capacitors toward +24 volts.

When the voltage across the capacitors rises above the voltage on the base of transistor 1 and the collector of transistor 2, diode 12 is forward biased and causes emitter current to flow in transistor 1. This current becomes collector current in transistor 1 and then base current for transistor 2 because of the base-to-emitter connection of each. These two transistors rapidly saturate, causing the discharge of timing capacitor 8 through resistor 13, and incidentally resistor 14. The result is an output pulse of very short duration at terminal 15. It will be noted that the discharge of delay capacitor 10 does not occur because of the back biased condition of diode 11 during the time the transistors 1 and 2 are saturated. Capacitor 10, therefore, retains its full charge and does not draw charging current for subsequent cycles. The current through resistor 7, previously used to charge capacitor 10, now flows into capacitor 8. The time required for the voltage at the junction of resistor 7 and timing capacitor 8 to reach a point at which diode 12 is forward biased, is therefore reduced and transistors 1 and 2 go into conduction in a shorter time than was required for the initial cycle of operation.

When it is desired to initiate operation of the oscillator, switch 16 is depressed to apply the voltage between resistors 22 and 23 to the base biasing network for transistor 17 which includes resistors 24 and 25. The application of a positive voltage to the base of transistor 17 causes it to saturate and increase the voltage drop across resistor 19. The base of transistor 18 is then at a more negative voltage than the emitter which is connected to the tap on potentiometer 20 in series with resistor 21. Transistor 18 no longer clamps the voltage across capacitors 8 and 10. The release of the clamp across capacitors 8 and 10 allows them to charge through resistor 7. With switch 16 closed the circuit behaves as an oscillator with capacitors 8 and 10 charging on the initial cycle of operation and only capacitor 8 thereafter.

Figure 2:
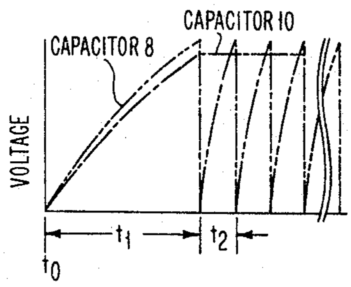
FIGURE 2 is an oscillogram of the voltage waveforms at the timing capacitors of the embodiment of FIGURE 1.

As previously described, FIGURE 2 is illustrative of the voltages across capacitors 8 and 10. When switch 16 is closed at $t_0$ to initiate operation of the circuit, the voltage across the two capacitors begins to rise. It will be noted that there is slightly less voltage at the high potential side of the capacitor 10 due to the drop across diode 11. At the end of the time $t_1$ the voltage across two capacitors has increased to the point where diode 12 is forward biased. At this instant transistors 1 and 2 conduct heavily to reduce the voltage across capacitor 8 to a predetermined level. Transistors 1 and 2 cease to conduct when the voltage at the emitter of transistor 1 is insufficient to provide the necessary base current to transistor 2 to hold the combination in saturation. The greater the value of resistor 13, the higher this minimal voltage will be. When capacitor 8 has discharged to the minimal point, transistors 1 and 2 are cut off and the voltage again begins to rise. It will be noted that the time required for charging both capacitors 8 and 10 was $t_1$. The subsequent recharging of only capacitor 8 occurs in a much shorter time $t_2$. Potentiometer 20 determines the initial voltage across capacitors 8 and 10, and, therefore, also the first cycle time, $t_1$, required to reach the level at which discharge occurs. Resistors 6 determines the time, $t_2$, required to recharge capacitor 8. Resistor 6 will also affect the time $t_1$ so the preferred alignment procedure would be to set $t_2$ first and then $t_1$. By proper selection of the biasing level established by potentiometer 20 and the variable resistor 6, it is possible to achieve a wide range of adjustment for $t_1$ and $t_2$. In the embodiment shown, the following components were used to produce a time of .45 second for $t_1$, and 105 milliseconds for $t_2$:

| | | |
|---|---|---|
| Resistor **4** | Ohms | 4.32K |
| Resistor **5** | do | 3.01K |
| Resistor **6** | do | 20K |
| Resistor **7** | do | 178K |
| Resistor **9** | do | 100K |
| Capacitor **8** | Microfarads | 1 |
| Capacitor **10** | do | 4.7 |
| Resistor **13** | Ohms | 100 |
| Resistor **14** | do | 20K |
| Potentiometer **20** | do | 1,000 |
| Resistor **21** | do | 4.75K |

Figure 3:
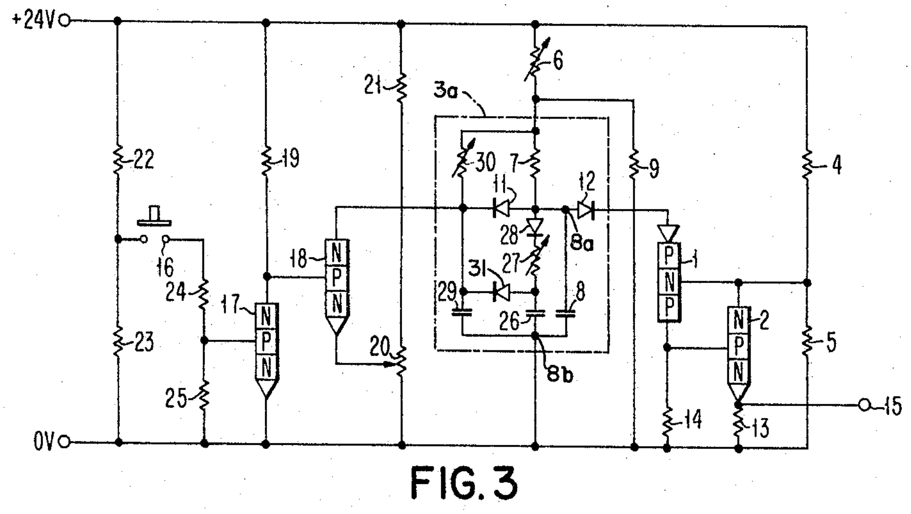
FIGURE 3 is a schematic drawing of an RC oscillator which produces pulses at three different frequencies in sequence.
Figure 4:
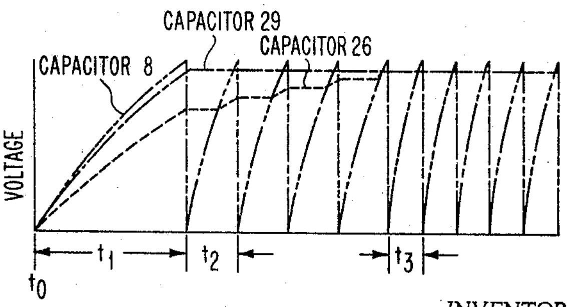
FIGURE 4 is an oscillogram of the voltage waveforms at the timing capacitors of the embodiment of FIGURE 3.

The embodiment shown in FIGURE 3 closely resembles that previously described with the exception that an additional capacitor and diode cooperate to provide an intermediate pulse rate. The difference between the two embodiments is contained in the RC timing network 3*a*. The operation of capacitor 8 and resistor 7 remains essentially unchanged. However, it will be observed that an additional delay capacitor 26 is connected to the source of charging current through a variable resistor 27 and a diode 28. As shown in FIGURE 4 the charge or voltage across capacitor 8 follows essentially the same pattern as that for FIGURE 1. The time constant for the combination of capacitor 26, resistor 27, and diode 28 is selected so that capacitor 26 does not charge completely in the time $t_1$ of the first cycle. Capacitor 29 is charged through resistor 7 and diode 11 in a manner similar to capacitor 10 of the first embodiment. If desired, a vernier resistor 30 may be added to provide some adjustment of the $t_1$ period. As shown in FIGURE 4, capacitor 29 charges to its maximum voltage at the end of the first cycle $t_1$. Diode 11 becomes back biased at the same time that diode 12 becomes forward biased. The result is that capacitor 29 retains its charge and removes itself from the timing network through the switching action of diode 11. Subsequent cycles for the next period are determined by the time required to charge capacitor 8 with the current through resistor 7 not absorbed by capacitor 26. This is shown in FIGURE 4 as the interval during which the cycle length is the time $t_2$.

When capacitor 26 finally reaches its full charge, diode 28 becomes back biased thereby leaving only capacitor 8 to determine the frequency of operation. The cycles then assume the length $t_3$ which is essentially that of $t_2$ in FIGURE 3. Diode 31 is in the circuit for the purpose of discharging capacitor 26 through transistor 18 at the time when switch 16 is opened to stop the oscillator. Capacitors 8 and 29 are discharged in the same manner as capacitors 8 and 10 in FIGURE 1.

Thus, the embodiment of FIGURE 3 provides three series of pulses. The first pulse taking a fairly long time $t_1$ to complete, the second series of pulses having a slightly shorter period $t_2$, and the third series having a period $t_3$. This circuit is particularly useful in accelerating a synchronous stepping motor. The first pulse initiates operation of the motor, the next series of pulses accelerates it to an intermediate speed, and the third series of pulses operates the motor at the maximum rate. The circuit of FIGURE 1 is useful in converting time duration signals into discrete pulses. For example, the one-half second closure of switch 16 produces a single pulse, while a two and one-half second closure produces twenty pulses. Such circuits are useful in the application of analog output signals to process control equipment.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. In an RC timing circuit for a relaxation oscillator having a voltage sensing and discharge circuit,
- a source of charging current;
- a timing capacitor having a first terminal;
- means connecting said first terminal to said source to charge said timing capacitor;
- a delay capacitor,
- means, including diode means, connecting said delay capacitor to said first terminal for charging by said source and blocking the flow of current in the reverse direction, and
- means further connecting said first terminal to the voltage sensing and discharge circuit to discharge only said timing capacitor when the voltage thereacross reaches a predetermined level.

2. A circuit according to claim 1 wherein said means connecting said first terminal to said source to charge said timing capacitor includes current limiting means.

3. In an RC timing circuit for a relaxation oscillator having a voltage sensing and discharge circuit,
- a source of charging current,
- a timing capacitor,
- current limiting means connecting said timing capacitor to said source to be charged thereby,
- a delay capacitor,
- means, including diode means, connecting said delay capacitor in parallel circuit with said timing capacitor for charging by said source and blocking the flow of current in the reverse direction,
- means connecting said timing capacitor to the voltage sensing and discharge circuit to discharge only said timing capacitor when the voltage thereacross reaches a predetermined level,
- said diode means being polarized to block the reverse flow of current from said delay capacitor.

4. In a relaxation oscillator having a timing capacitor, a source of current, current limiting means connecting said source to said timing capacitor, and a voltage sensing and discharge circuit connected to the junction of said current limiting means and said capacitor to provide a normal oscillation period,
- means for delaying the completion of the first cycle of oscillation comprising:
- a delay capacitor, diode means connecting said delay capacitor in parallel circuit with said timing capacitor to draw a charging current from said source through said current limiting means to reduce the current available to charge said timing capacitor, said diode means being polarized to block the reverse flow of current from said delay capacitor, whereby the time required for said timing capacitor to first reach the level at which discharge occurs is determined jointly by said timing and delay capacitors and subsequent oscillation periods by the timing capacitor alone.

5. In a relaxation oscillator having a timing capacitor, a source of current, current limiting means connecting said source to said timing capacitor, and a voltage sensing and discharge circuit connected to the junction of said current limiting means and said capacitor to provide a normal oscillation period, means for reducing said frequency for a first period of time comprising:

a delay capacitor, diode means connecting said delay capacitor in parallel circuit with said timing capacitor to draw a charging current from said source through said current limiting means to reduce the current available to charge said timing capacitor, thereby lengthening the time required for said timing capacitor to reach the level at which discharge occurs, said diode means being polarized to block the discharge of said delay capacitor by said discharge circuit to prevent the drawing of charging current by said delay capacitor after the voltage thereacross reaches the level at which said timing capacitor is discharged.

6. In an RC timing circuit for a relaxation oscillator having a voltage sensing and discharge circuit, a source of charging current, a timing capacitor having a first terminal, a plurality of delay capacitors, means connecting said first terminal to said source to change said timing capacitor, means, including diode means, individually connecting said delay capacitors to said first terminal for charging by said source and blocking the flow of current in the reverse direction, and means connecting said first terminal to the voltage sensing and discharge circuit to discharge only said timing capacitor when the voltage thereacross reaches a predetermined level.

7. A circuit according to claim 6 including current limiting means in series circuit with at least one of said diode means and said delay capacitors.

8. In an RC timing circuit for a relaxation oscillator having a voltage sensing and discharge circuit, a source of charging current, a plurality of timing capacitors, means, including a terminal, connecting a first of said capacitors to said source to be charged thereby, diode means individually connecting the remaining of said capacitors to said terminal for charging by said source and polarized to block the reverse flow of current from said remaining capacitors, current limiting means in series circuit with at least one of said diode means and said remaining capacitors to limit the charging current into the associated capacitor, and means further connecting said terminal to the voltage sensing and discharge circuit to discharge only said first capacitor when the voltage thereacross reaches a predetermined level.

9. A circuit according to claim 8 wherein said means connecting a first of said capacitors to said source to be charged thereby includes current limiting means.

References Cited

"Nanosecond Sensing Circuit With 100 Megohm Input Impedance," GE transistor design package, vol. 3, folio 1, February 1963.

ROY LAKE, *Primary Examiner.*

J. B. MULLINS, *Assistant Examiner.*